June 27, 1950 W. J. SMITH ET AL 2,512,690
UNIVERSAL JOINT
Filed May 20, 1946 2 Sheets-Sheet 1

INVENTORS
William J. Smith
William W. Slaght
BY
Evans + McCoy
ATTORNEYS

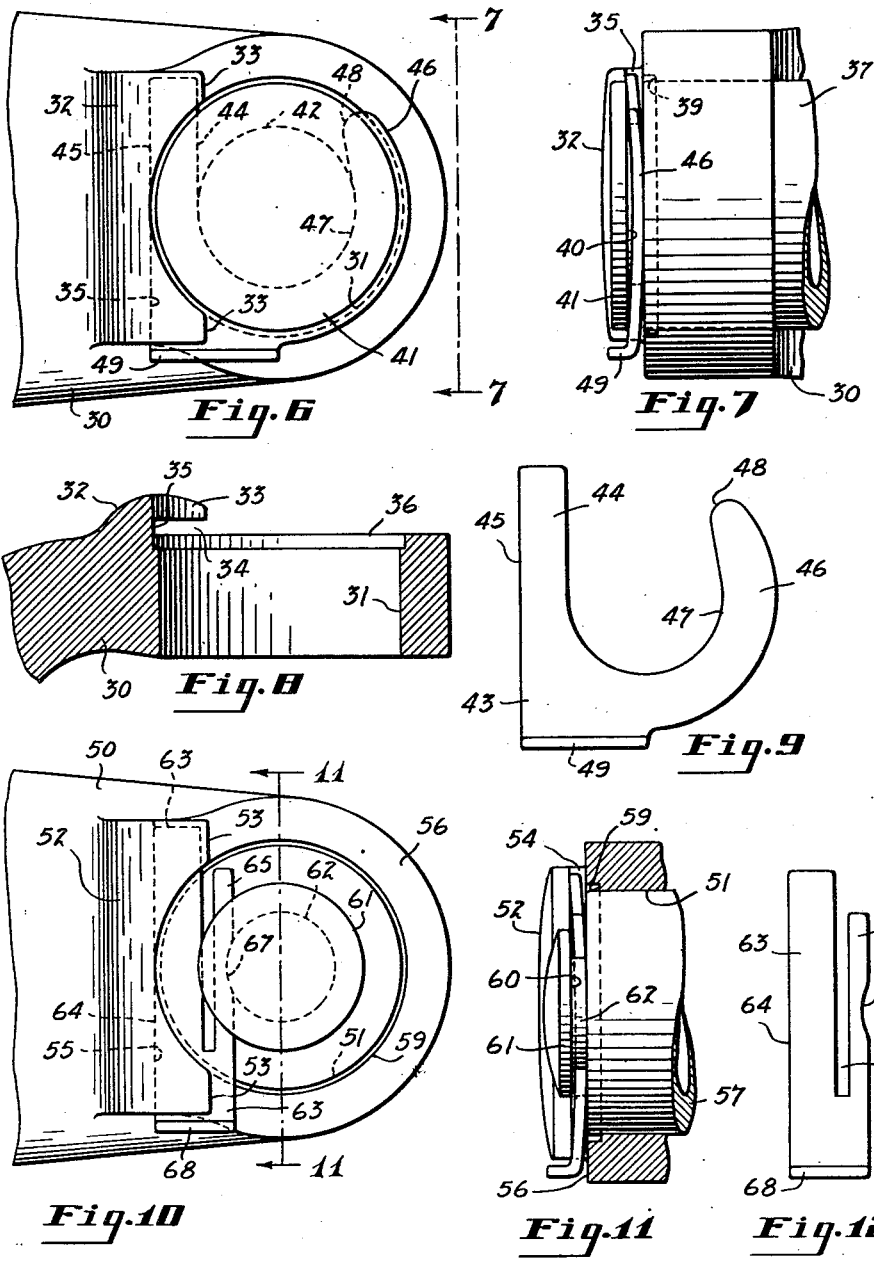

Patented June 27, 1950

2,512,690

UNITED STATES PATENT OFFICE 2,512,690

UNIVERSAL JOINT

William J. Smith and William W. Slaght, Rocky River, Ohio, assignors to Cleveland Steel Products Corporation, Cleveland, Ohio, a corporation of Ohio Application May 20, 1946, Serial No. 671,000

12 Claims. (Cl. 64—17)

This invention relates to universal joints and more particularly to a releasable fastening for pivot members mounted in yoke arms of such joints.

The invention has for its object to provide a universal joint in which the pivotal connections are securely locked in place, but in which the locking means are readily accessible and readily removable so that the joint can be quickly and easily taken apart when desired.

A further object is to provide a pivot retainer in the form of a key that can be instantly driven into place by tapping it with a hammer and which when once in place is securely locked against accidental displacement.

A further object is to provide a retainer in the form of a resilient key that is adapted to snap into locking engagement with a portion of a pivot member and which may be quickly dislodged by means of a suitable tool when desired.

A further object of the invention is to provide a means for normally locking each of the pivot bearings against turning movements in the yokes that will yield and permit turning of the bearing member without breakage of any of the parts if such bearing member should become frozen to the pivot that is journaled therein.

Reference should be had to the accompanying drawings forming a part of this specification, in which:

Fig. 6 is a side elevation showing a joint having a modified form of retainer;

Fig. 7 is a fragmentary elevation of the yoke arm viewed as indicated at 7—7 in Fig. 6;

Fig. 8 is a sectional view showing the yoke arm with the pivot members and retainer removed;

Fig. 9 is a plan view of the retainer shown in Figs. 6 and 7;

Fig. 10 is a side elevation of another modified form of joint;

Fig. 11 is a section taken on the line indicated at 11—11 in Fig. 10, and

Fig. 12 is a side elevation of the retainer shown in Fig. 10.

The present invention is primarily concerned with a means of retaining pivot members in yokes of universal joints and in the accompanying drawings the invention is illustrated as applied to a universal joint of the type in which the pivot members are in the form of trunnions carried by a connecting spider and bearing members for the trunnions mounted in the yoke arms.

Figure 1:
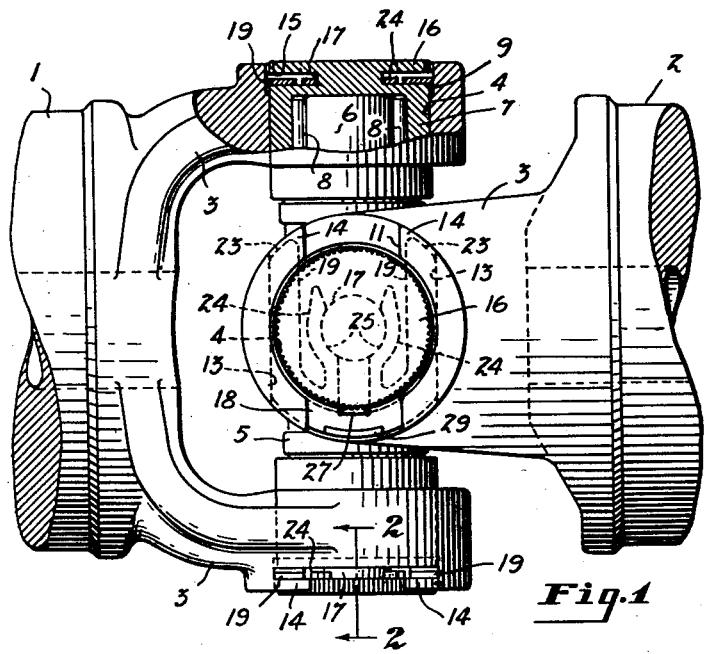
Figure 1 is a side elevation of a universal joint embodying the invention, a portion of one of the yoke arms being broken away and shown in section.
Figure 3:
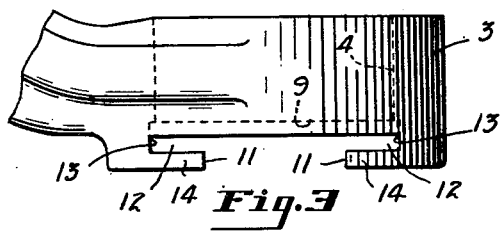
Fig. 3 is a fragmentary side elevation of a yoke arm with the pivot members and retainer removed.

Referring to the drawings, Fig. 1 shows a universal joint of a conventional type having coupling yokes 1 and 2 provided with arms 3 which have radially disposed pivot receiving openings 4 for pivotal connection to a connecting spider 5. The pivot members connecting the spider 5 to the arms 3 of the yokes which straddle the spider comprise four radially projecting trunnions 6 and bearing cups 7 mounted in the openings 4 in which the trunnions 6 are journaled. The openings 4 have an internal diameter enough larger than that of the trunnions 6 to permit the spider to be inserted between the yoke arms of each coupling member, with its trunnions extending into the openings of the yoke arms before the bearing cups 7 are inserted. The bearing cups 7 are then inserted on the outer sides of the arms into the openings 4 with their open ends facing inwardly to receive the trunnions 6. Suitable anti-friction rollers 8 are preferably carried by the bearing cups to reduce the friction resistance to relative turning movements between the trunnion and bearing. Counterbores 9 may be provided at the outer ends of the openings 4 to facilitate the insertion of the bearing cups into the openings.

The outer face of each yoke arm is provided with parallel opposed shoulders 11 that face the axis of the opening. The shoulders 11 are at the margin of the cup receiving opening and spaced apart a distance less than the diameter of the opening so that a pair of shoulders are provided at each side of the central axis with the shoulders of each pair separated by portions of the opening 4. The shoulders are provided with inwardly facing opposed channels 12 and these channels have their inner sides lying in the same plane so that the channels in each pair of shoulders are in alinement with each other and with the channels of the opposite pair. The channels 12 have bottoms 13 that are parallel to the shoulders 11 and tangential to the opening 4 at diametrically opposite points.

The channeled outer face of each arm may be formed by first forming a channel transversely across the opening 4 and then undercutting the shoulders thus formed with a suitable broach. The channels 12 form four retaining flanges 14 spaced about the margin in the opening 4. The outer end of the bearing cup 7 has a circumferential channel 15 therein that is adapted to register with the channels 12 of the yoke arm. The channel 15 provides a circumferential retaining flange 16 at the outer end of the bearing cup that is joined to the body of the cup by a restricted neck portion forming the bottom of the channel 15 and that preferably has a serrated periphery.

Figure 2:
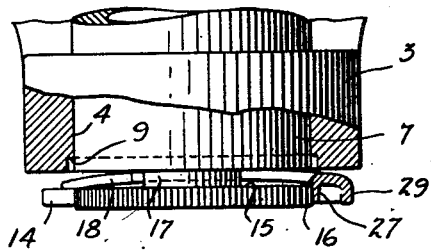
Fig. 2 is a fragmentary section taken on the line indicated at 2—2 in Fig. 1.
Figures 4, 5:
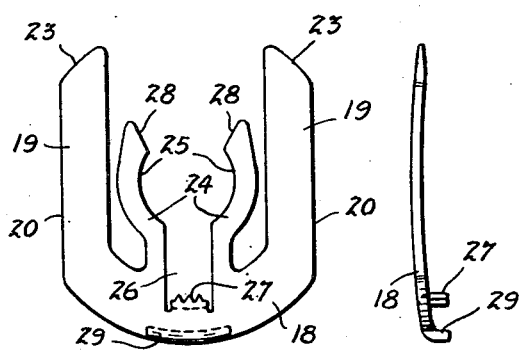
Fig. 4 is a plan view of the resilient key or retainer for locking a pivot member in place in the yoke arm.
Fig. 5 is a side elevation of the key shown in Fig. 4.

For locking the pivot member in place a retainer or locking key 18 is provided that is formed of resilient sheet metal and bowed longitudinally as shown in Figs. 2 and 5. The key 18 has spaced parallel longitudinal arms 19 with outer side edges 20 that are adapted to slidably engage the bottoms 13 of the grooves 12, the free ends 23 of the arms 19 being beveled to facilitate the insertion of the key into the slots. Between the arms 19 the key 18 is provided with two intermediate resilient arms 24 that have arcuate inner edges 25 shaped to conform to the neck portion 17 of the pivot member. The outer ends of the arms 24 are normally spaced apart a distance less than the diameter of the neck portion 17 so that they must be spread apart to pass over the neck 17 when the key is driven into place. In order to give the arms 24 the necessary yieldability, they are separated inwardly of the recessed portions 25 by a slot 26 and at the inner end of the slot 26 there is an integral serrated laterally projecting tongue 27 that has a serrated face adapted to engage the serrated periphery of the flange 16 of a bearing cup to normally hold the cup against turning movements in the opening 4. Since the locking tongue 27 is resilient and the serrations relatively shallow the tongue 27 will yield and permit turning movements without breakage of parts if a trunnion 6 should become frozen to the bearing cup. The outer ends 28 of the arms 24 are oppositely beveled to guide the arms over the neck 17 so that the arms will slide over diametrically opposite portions of the neck 17 and snap into clamping engagement with the neck 17 to firmly retain the key in locking position. The key 18 is provided at its outer end with a short flange 29 that serves as an impact head for driving the key into locking engagement with the pivot member, or for dislodging the key when it is desired to take the joint apart.

The retainer 18 is driven into place with the convex side thereof facing inwardly as shown in Fig. 2, so that the flattening of the resilient retainer causes the ends thereof to press outwardly against the flanges 14 and the center thereof to press inwardly against the cup 7, so as to eliminate any end play that might otherwise be present due to manufacturing tolerances.

In Figs. 6 to 9 of the drawing a joint employing a locking key or retainer of modified form is shown. In this modification a yoke arm 30 provided with a pivot receiving opening 31 has a raised portion 32 on its outer face along the inner side of the opening and extending along a margin of the opening to provide shoulders 33 spaced apart by a portion of the opening 31 and facing toward the center of the opening. The shoulders 33 are undercut to provide a channel 34 that has a bottom 35 parallel to the shoulders 33 and tangentially disposed with respect to the opening 31, the arm 30 having a flat face 36 outwardly of the shoulders 33 in the plane of the inner sides of the channels 34. A pivot member in the form of a bearing cup 37 is mounted in the opening 31 which may be provided with a counterbore 39 to facilitate the insertion of the cup. Adjacent its outer end the bearing cup has a circumferential channel 40 that is adapted to register with the channels 34 in the yoke arm, the channel 40 forming a retaining flange 41 at the outer end of the cup and a neck portion 42 connecting the flange 41 to the body of the cup.

A longitudinally bowed resilient locking key 43 has a shoulder engaging arm 44 provided with a straight edge 45 for engagement with the bottom 35 of the channel 34 and a curved arm 46 for engagement with the neck portion of the pivot member. The arm 46 has an arcuate inner edge 47 shaped to tightly grip the neck 42 and a rounded end 48 which is spaced from the arm 44 a distance slightly less than the diameter of the neck 42 so that the arm 46 may be guided and sprung over the neck 42 when the key is driven into place in the registering slots of the yoke arm and pivot member. When secured in place the cup 37 is normally held against turning movements by the gripping action of the arm 46. The key 43 is formed of resilient sheet metal and the arm 46 is sufficiently flexible to spring away from the arm 44 when pressed against the neck portion 43 of the pivot member and to snap into clamping engagement with said neck portion to securely hold the key in place. The key 43 has a short flange 49 that provides a head which may be struck by a hammer to drive the key into locking position and which may be engaged by a suitable tool to remove it from the arm.

The longitudinal bowing of the key causes the end portions of the key to press outwardly against the interior of the retaining flanges of the arm and the central portion to press inwardly against the body of the bearing cup 37, so as to firmly hold the bearing cup in its innermost position and take up end play.

In Figs. 10, 11 and 12 of the drawings, a further modification of the invention is shown, in which a yoke arm 50 has a pivot receiving opening 51 and a raised portion 52 on its outer face on the inner side of the opening, the raised portion extending along opposite margins of the opening toward the center thereof to provide spaced shoulders 53 that face toward the center of the opening and that are separated by a portion of the opening.

Shoulders 53 are undercut to provide channels 54 which have bottoms 55 parallel to the shoulders 53 and tangentially disposed with respect to the opening 51. The arm 50 has a flat outer face 56 outwardly of the shoulders 53 that is flush with the inner sides of the channels 54. A pivot member in the form of a bearing cup 57 is mounted in the opening 51 which may have a counterbore 59 to facilitate insertion of the cup. The cup 57 has a circumferential channel 60 adjacent its outer end that provides a circumferential retaining flange 61 connected to the body of the cup by a neck portion 60.

A locking key 63 that is formed of resilient sheet metal and longitudinally bowed is provided for locking the pivot member to the arm, has a straight edge 64 for engagement with the tangentially disposed bottom of the channel 54 and has a yieldable arm 65 spaced from the body of the key by a longitudinal slot 66. The total width of the key 63 is slightly greater than the distance between the slot bottom 55 and the periphery of the neck portion 62 so that the arm 65 is sprung inwardly toward the body of the key when the key is driven into the channels 54 and 60.

The outer edge of the arm 65 has a recess 67 for engagement with the neck portion 62 of the pivot member so that the arm 65 snaps into locking engagement with the neck 62 when the key is driven into locking position to retain the key in place and to frictionally hold the bearing cup against turning movements. The key is provided at the end thereof with a short flange 68 which forms a driving head to facilitate the driving of the key into locking position with a hammer. The flange also provides a projection adapted to be engaged by a suitable tool to remove the key. The longitudinal bowing of the key serves to maintain a yielding inward thrust on the pivot member due to the flattening of the key when it is driven into locking position so as to take up end play.

It is to be understood that variations and modifications of the specific devices herein shown and described for purposes of illustration, may be made without departing from the spirit of the invention.

What we claim is:

1. In a universal joint, a yoke arm provided with a pivot receiving opening, said arm having projecting shoulders on its outer face laterally of the axis of the opening and separated by a portion of the opening, said shoulders having alined channels facing toward said axis and extending outwardly from the opening, a pivot member fitting in said opening and having a circumferential channel adjacent its outer end registering with said shoulder channels and forming a retaining flange and a restricted neck portion connecting the flange to the body of the member, and means securing said member in said opening comprising a locking key positioned in said registering channels and having a resilient retaining portion provided with a neck receiving process bearing against said neck portion of the pivot member.

2. In a universal joint, a yoke arm provided with a pivot receiving opening, said arm having projecting shoulders on its outer face laterally of the axis of the opening and separated by a portion of the opening, said shoulders having alined channels facing toward said axis and extending outwardly from the opening, a pivot member fitting in said opening and having a circumferential channel adjacent its outer end registering with said shoulder channels and forming a retaining flange and a restricted neck portion connecting the flange to the body of the member, and means securing said member in said opening comprising a locking key positioned in said registering channels and having a resilient retaining portion bearing against said neck portion of the pivot member and provided with a neck engaging recess, said key being formed of resilient sheet metal and having its groove engaging portion bowed longitudinally so that the key exerts an axial thrust on the pivot member.

3. In a universal joint, a yoke arm provided with a pivot receiving opening, said arm having projecting shoulders on its outer face laterally of the axis of the opening and separated by a portion of the opening, said shoulders having alined channels facing toward said axis and extending outwardly from the opening, a pivot member fitting in said opening and having a circumferential channel adjacent its outer end registering with said shoulder channels and forming a retaining flange and a restricted neck portion connecting the flange to the body of the member, and means securing said member in said opening comprising a resilient metal locking key positioned in said registering channels and having a recessed portion receiving said neck portion of the pivot member and resiliently gripping said neck portion.

4. In a universal joint, a yoke arm provided with a pivot receiving opening, said arm having projecting shoulders on its outer face laterally of the axis of the opening and separated by a portion of the opening, said shoulders having channels facing toward the axis, the inner walls of the channels being in the plane of the portion of the outer face of the arm disposed laterally of the shoulder and the bottom of the channels being disposed tangentially of the opening, a pivot member in said opening projecting past the inner walls of said channels and having a circumferential channel registering with the shoulder channels, said circumferential channel forming a retaining flange and a restricted neck portion joining said flange to the body of said member, and means securing said member in said opening comprising a bowed resilient sheet metal key positioned in said registering channels and provided with a resilient neck gripping portion.

5. In a universal joint, a yoke arm provided with a pivot receiving opening, said arm having projecting shoulders on its outer face laterally of the axis of the opening and separated by a portion of the opening, said shoulders having channels facing toward the axis, the inner walls of the channels being in the plane of the portion of the outer face of the arm disposed laterally of the shoulder and the bottom of the channels being disposed tangentially of the opening, a pivot member in said opening projecting past the inner walls of said channels and having a circumferential channel registering with the shoulder channels, said circumferential channel forming a retaining flange and a restricted neck portion joining said flange to the body of said member, and a bowed resilient sheet metal key having an edge portion engaging the tangential bottom of the shoulder channels and a retaining portion laterally of the edge portion resiliently gripping said neck portion of the pivot member.

6. In a universal joint, a yoke arm provided with a pivot receiving opening, said arm having a recess on its outer face diametrically disposed with respect to said opening and providing pairs of opposed shoulders facing the axis of the opening, the shoulders of each pair being separated by a portion of the opening, said shoulders having oppositely facing channels the bottoms of which are substantially parallel and tangential to the opening, a pivot member in the opening provided with a circumferential channel registering with the shoulder channels, said circumferential channel providing a retaining flange and a restricted neck portion joining the flange to the body of the pivot member, and a sheet metal key in said channels and locking said pivot member in place, said key having spaced arms engaging in the shoulder channels upon opposite sides of the axis and resilient arms intermediate said spaced arms in resilient gripping engagement with the neck portion of said pivot member.

7. In a universal joint, a yoke arm provided with a pivot receiving opening, said arm having a stepped outer face providing shoulders at the margin of the opening spaced laterally of the axis of the opening and spaced apart by portions of the opening, said shoulders having inwardly opening channels, a bearing cup fitting in said opening with its closed ends at the outer face of the arm, said bearing cup having a circumferential channel adjacent its outer end that registers with the shoulder channels, said circumferential channel forming a retaining flange at the end of the cup and a restricted neck portion connecting said flange to the closed end of the cup, and means for securing said cup in said opening comprising a locking key positioned in the registering channels and having a resilient recessed portion in retaining engagement with said neck portion of the bearing member.

8. In a universal joint, a yoke arm provided with a pivot receiving opening, said arm having a stepped outer face providing shoulders at the margin of the opening spaced laterally of the axis of the opening and spaced apart by portions of the opening, said shoulders having inwardly opening channels, a bearing cup fitting in said opening with its closed ends at the outer face of the arm, said bearing cup having a circumferential channel adjacent its outer end that registers with the shoulder channels, said circumferential channel forming a retaining flange at the end of the cup and a restricted neck portion connecting said flange to the closed end of the cup, and means securing said cup in said opening comprising a bowed resilient key positioned in said registering channels and exerting an axial inward thrust on said cup, said key having a recessed portion in retaining engagement with said neck portion of the bearing cup.

9. In a universal joint, a yoke arm provided with a pivot receiving opening, said arm having raised portions on its outer face along the margin of the opening providing opposed pairs of inwardly facing shoulders undercut to provide inwardly facing channels, a pivot member having a circumferential channel registering with the shoulder channels, and a locking key having spaced arms engaging in the shoulder channels and spaced resilient arms between the first mentioned arms in diametrically opposite portions of the channel of the pivot member and gripping said pivot member.

10. In a universal joint, a yoke arm provided with a pivot receiving opening, said arm having a raised portion along a margin of the opening providing shoulders facing toward the axis of the opening, said shoulders being undercut to provide alined channels, a pivot member having a circumferential channel registering with said shoulder channels, and means securing said member in said opening comprising a locking key having an arm positioned in the registering channels of the arm and pivot member, and a curved resilient arm spaced from the first mentioned arm, the latter arm embracing said pivot member and in locking engagement with the pivot member.

11. In a universal joint, a yoke arm provided with a pivot receiving opening, said arm having a raised portion along a margin of the opening providing shoulders facing toward the axis of the opening, said shoulders being undercut to provide alined channels, a pivot member having a circumferential channel registering with said shoulder channels, and means securing said member in said opening comprising a locking key positioned in the registering channels between the pivot and yoke arm, said key being wider than the space between the bottoms of the channels of the arm and pivot members, and having a longitudinal slot providing a resilient arm that engages with the pivot member, said resilient arm having a recess in which the pivot member is received.

12. In a universal joint, a yoke arm provided with a pivot receiving opening, said arm having projecting shoulders on its outer face laterally of the axis of the opening and separated by a portion of the opening, said shoulders having alined channels facing toward said axis and extending outwardly from the opening, a pivot member fitting in said opening and having a circumferential channel adjacent its outer end registering with said shoulder channels and forming a retaining flange and a restricted neck portion connecting the flange to the body of the member, said flange having a serrated periphery, and means securing said member in said opening comprising a locking key positioned in said registering channels and having a resilient retaining portion provided with a neck engaging recess, said key having an integral projecting tongue provided with serrations and engaging with the serrated periphery of said flange to hold said pivot member against turning movements in said arm.

WILLIAM J. SMITH.
WILLIAM W. SLAGHT.

REFERENCES CITED

The following references are of record in the file of this patent:

UNITED STATES PATENTS

| Number | Name | Date |
|---|---|---|
| 639,337 | Anthony | Dec. 19, 1899 |
| 1,993,357 | Braun et al. | Mar. 5, 1935 |
| 2,032,497 | Padgett | Mar. 3, 1936 |

Certificate of Correction

Patent No. 2,512,690 June 27, 1950

WILLIAM J. SMITH ET AL.

It is hereby certified that error appears in the printed specification of the above numbered patent requiring correction as follows:

Column 5, line 42, for the word "process" read *recess*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*